(12) United States Patent
Huelke et al.

(10) Patent No.: US 8,636,313 B2
(45) Date of Patent: Jan. 28, 2014

(54) ADJUSTABLE PILLAR TRIM GRAB HANDLE FOR VEHICLE

(75) Inventors: David Huelke, Milan, MI (US); Paul Tuomisto, Grosse Ile, MI (US); Justin Lee Healy, Canton, MI (US); Adam W. Hellar, Flatrock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/531,721

(22) Filed: Jun. 25, 2012

(65) Prior Publication Data

US 2013/0341947 A1 Dec. 26, 2013

(51) Int. Cl.
*B60N 3/02* (2006.01)

(52) U.S. Cl.
USPC .......................... 296/1.02; 16/110.1

(58) Field of Classification Search
USPC .................. 296/1.02; 16/110.1, 429
See application file for complete search history.

(56) References Cited

U.S. PATENT DOCUMENTS

| 6,447,055 | B1 | 9/2002 | Mainville et al. |
| 6,758,584 | B2 | 7/2004 | Bach et al. |
| 7,744,141 | B2 | 6/2010 | Saionji et al. |
| 8,052,188 | B2 * | 11/2011 | Chernoff et al. ............. 296/1.02 |
| 2004/0036305 | A1 | 2/2004 | Smith et al. |

FOREIGN PATENT DOCUMENTS

| EP | 1736336 A1 | 12/2006 |
| WO | 03078233 A2 | 9/2003 |

* cited by examiner

*Primary Examiner* — Joseph Pape
(74) *Attorney, Agent, or Firm* — Shook Hardy & Bacon LLP

(57) ABSTRACT

A movable grab handle assembly attached to the interior surface of the vehicle such as the vehicle pillar or on or adjacent to the vehicle headliner is disclosed. The movable grab handle assembly includes a slot formed on a surface of the interior. The slot includes a base having an adjuster plate. A grab handle is slidably mounted in the slot. The grab handle includes a user-operated release, such as a push button, that is operatively engaged with an adjuster plate release mechanism in the form of a pin. By operation of the push button the pin is movable between an adjuster plate engaging position and an adjuster plate disengaging position. Through use of the push button the grab handle is released to move any position in a direction toward the top of the pillar and a direction toward the bottom of the pillar.

17 Claims, 4 Drawing Sheets

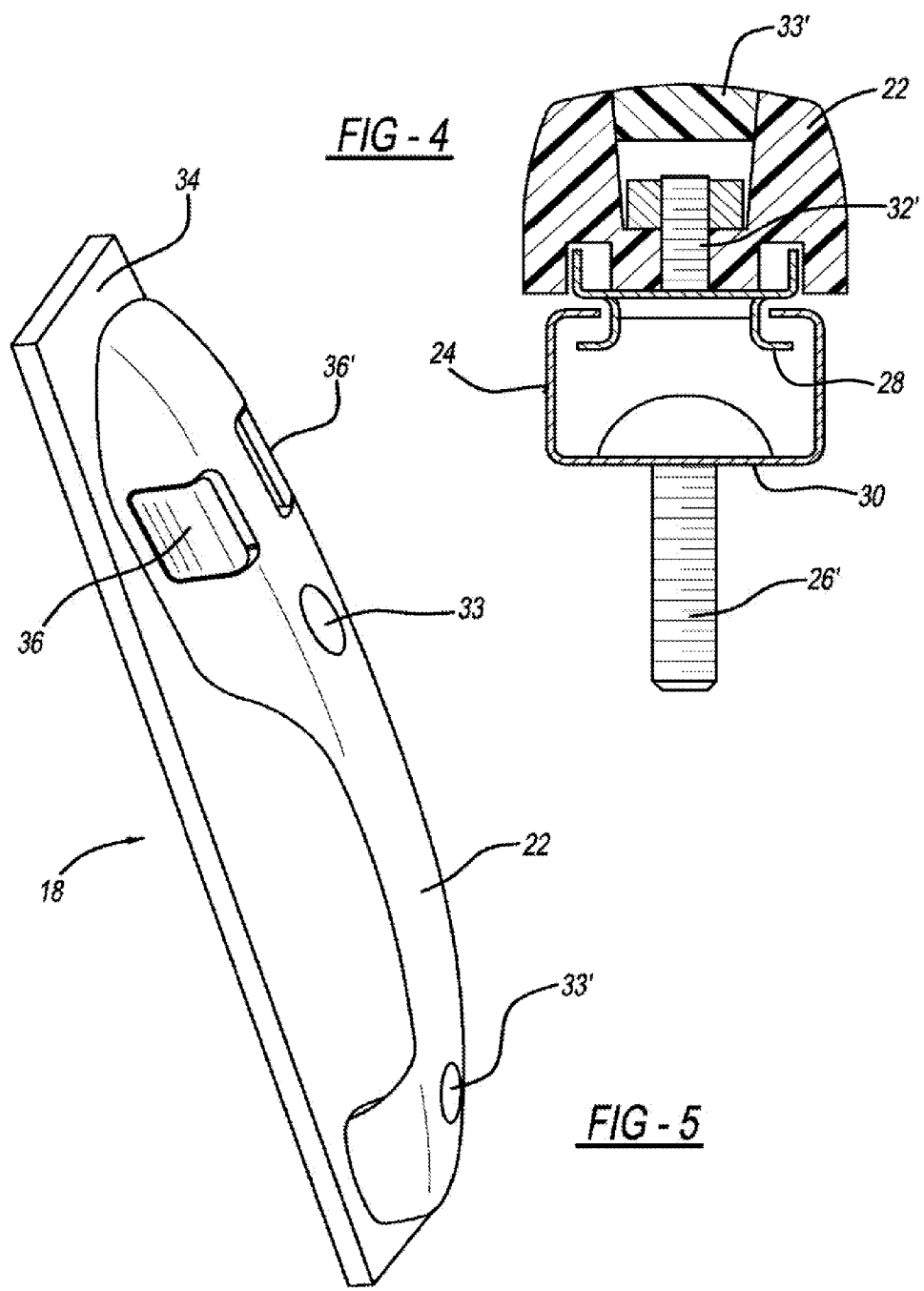

US 8,636,313 B2

ADJUSTABLE PILLAR TRIM GRAB HANDLE FOR VEHICLE

TECHNICAL FIELD

The disclosed invention relates generally to pillar trim grab handles for vehicles. More particularly, the disclosed invention relates to a movably adjustable grab handle for use on a vehicle's pillar trim or headliner.

BACKGROUND OF THE INVENTION

The interior of many vehicles, such as the truck or the SUV, typically includes one or more grab handles to provide assistance for a person to enter or exit the vehicle. The grab handle may be fitted to a variety of locations adjacent the door of the vehicle, such as on a pillar trim or on the headliner. Regardless of the location the grab handle is provided to give the person assistance when entering or exiting the vehicle.

While configurations such as length and width of the grab handle vary, the grab handle typically includes a metal core having sufficient strength to sustain the loads that can be applied when a passenger holds the handle when entering or exiting the vehicle. The handle also usually includes a molded body formed over the metal core.

Typically the pillar trim grab handle is mounted on the A pillar or the B pillar of the conventional vehicle. However, the pillar trim grab handle could be mounted in other locations as well, such as by the C pillar of a vehicle such as a four door vehicle or the D pillar of the rear lift gate of an SUV.

The headliner grab handle is typically located adjacent the upper end of the vehicle door opening. One or more headliner grab handles may be fitted to the vehicle and, in some instances, are provided above each door opening.

However, grab handles, particularly the pillar trim grab handles, may not be universally usable by all members of the vehicle-occupying public. Particularly, on vehicles having a higher center of gravity such as a truck, SUV or four-wheel drive vehicle a person having a smaller stature could have trouble accessing the grab handle. Because known grab handles are fixed in their location there is no opportunity for adjustment to make them more accessible to all persons.

SUMMARY OF THE INVENTION

The disclosed invention provides a movable grab handle assembly attached to the interior surface of a vehicle, such as on one or more of the A or B pillars or on other pillars, such as the C and D pillars if present. Alternatively or additionally the movable grab handle could be located above a door in a location on or near the vehicle headliner.

The movable grab handle assembly includes a slot formed on a surface of the vehicle's interior. The slot includes at least base having an adjuster plate. A grab handle is slidably mounted in the slot. The grab handle includes a user-operated release, such as a push button, that is operatively engaged with an adjuster plate release mechanism in the form of a pin. By operation of the push button the pin is movable between an adjuster plate engaging position and an adjuster plate disengaging position. Through use of the push button the grab handle is released to move to any position in a direction toward the top of the pillar and in a direction toward the bottom of the pillar.

The push button may, in fact, be two push buttons placed side by side. A biasing element such as a spring is associated with the push button arrangement to return the push button to its engaged position. Similarly a biasing element such as a spring is associated with the movable pin.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 4 is a sectional view taken along line 4-4 of FIG. 2 illustrating the movable grab handle in relation to the sliding mechanism and further illustrating a sliding mechanism interior surface fastener; and FIG. 5 is a perspective view of the grab handle in relation to the slide mechanism cover of the disclosed invention.

DETAILED DESCRIPTION OF THE PREFERRED EMBODIMENT

Figure 1:
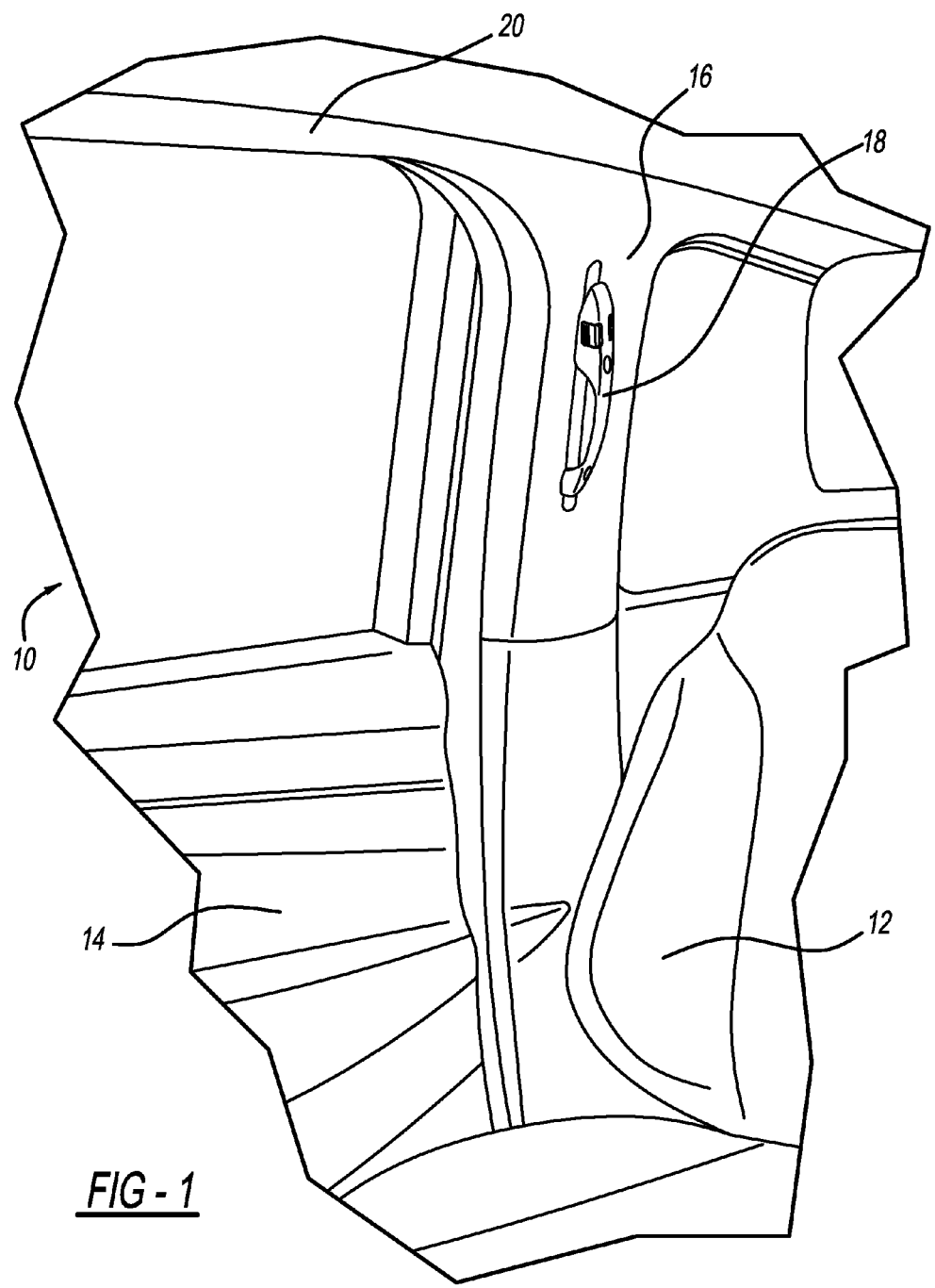
FIG. 1 is a partial image of a vehicle interior illustrating the movable grab handle assembly of the disclosed invention on a pillar surface.

In the following figures, the same reference numerals will be used to refer to the same components. In the following description, various operating parameters and components are described for different constructed embodiments. These specific parameters and components are included as examples and are not meant to be limiting.

With respect to FIG. 1, a partial image of a typical vehicle interior, generally illustrated as 10, is shown. The vehicle interior 10 includes a vehicle seat 12 and a vehicle door 14. Adjacent the vehicle door 14 is a pillar 16. The pillar 16 may be any one of the A, B, C or D pillars of a vehicle. In this case the B pillar is illustrated.

Mounted on the pillar 16 is a movable grab handle assembly 18 according to a preferred embodiment of the disclosed invention. While the movable grab handle 18 is shown as being mounted to the pillar 16, it should be understood that the movable grab handle assembly 18 of the disclosed invention may also be mounted to any surface adjacent the vehicle door 14 in any location that would provide assistance to the vehicle occupant on either his ingress or his egress. Thus the movable grab handle assembly 18 may also be mounted on, for example, a surface 20 formed above the door opening either on or adjacent to the vehicle's headliner. It is also to be understood that while only one movable grab handle assembly 18 is illustrated a plurality of movable grab handles 18 may be fitted to the interior of the vehicle.

Figure 2:
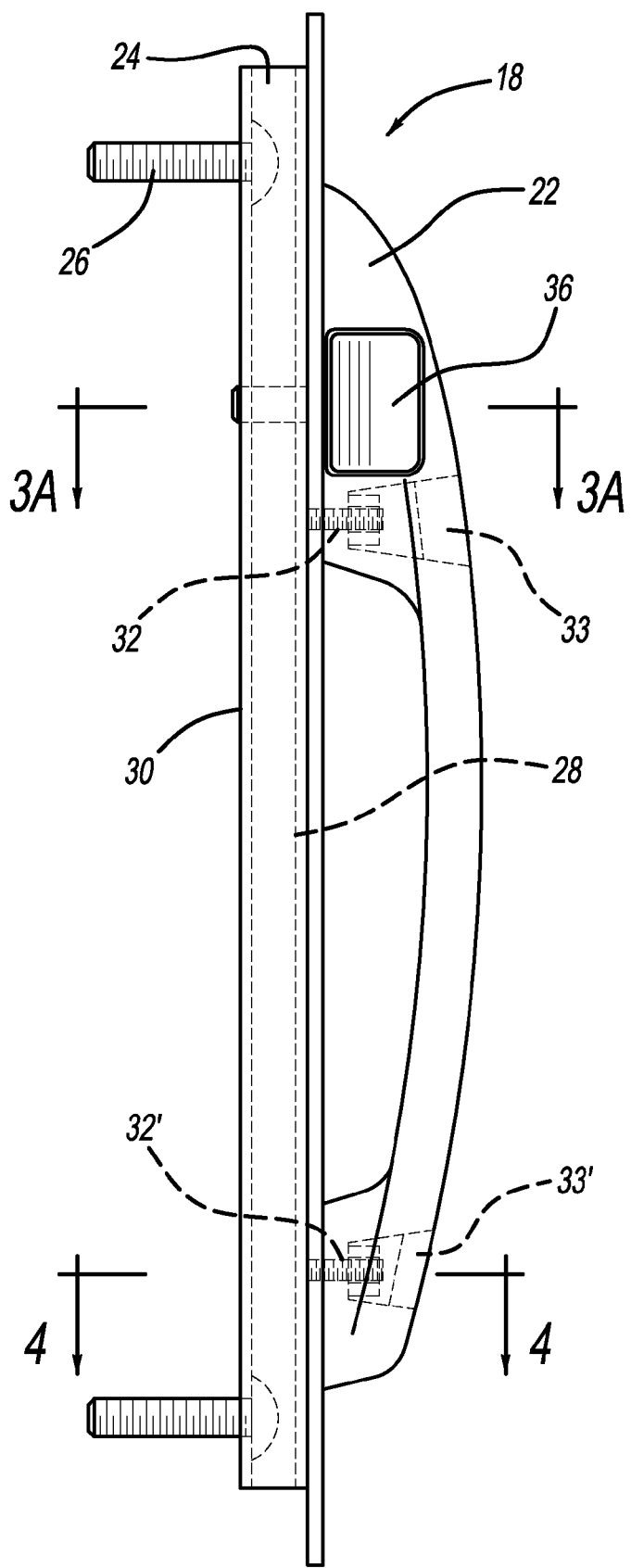
FIG. 2 is an elevational view of the grab handle assembly of the disclosed invention.

FIG. 2 illustrates an elevational view of the grab handle assembly 18 of the disclosed invention. The grab handle assembly 18 includes a movable grab handle 22 and a sliding mechanism 24. The sliding mechanism 24 is attached to a surface of the vehicle's interior by mechanical fasteners, such as mechanical fasteners 26 and 26'.

The sliding mechanism 24 includes an upper movable plate 28 and a fixed adjuster plate 30. The movable grab handle 22 is slidably attached to the upper movable plate 28 of the sliding mechanism 24 by mechanical fasteners, such as mechanical fasteners 32 and 32' as will be discussed in detail below with respect to FIG. 4. Preferably for the sake of improved aesthetics screw cap covers 33 and 33' are fitted over the outer ends of the mechanical fasteners 32 and 32' respectively. A slide mechanism cover 34 is disposed between the movable grab handle 22 and the sliding mechanism 24.

At least one push button 36 is fitted to the movable grab handle 22. The push button 36 is provided to allow the operator to selectively release the movable grab handle 22 from engagement with the fixed adjuster plate 30 of the sliding mechanism 24. This will be more fully understood by reference to FIG. 3A which is a view taken along line 3A-3A of FIG. 2.

Figure 3A:
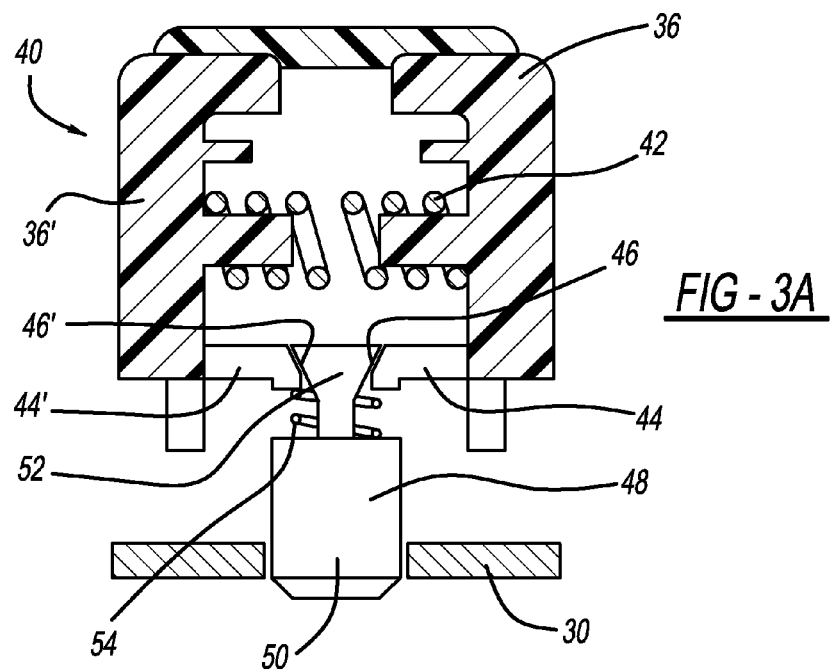
FIG. 3A is a sectional view taken along line 3A-3A of FIG. 2 illustrating the side-by-side push button arrangement in relation to the pin and adjuster plate of the disclosed invention further illustrating the engagement assembly of the movable grab handle in its engaged position relative to the adjuster plate.

With reference to FIG. 3A, the push button 36 is a component of an engagement assembly 40 that also preferably but not necessarily includes a second push button 36'. The push buttons 36 and 36' are urged apart by a spring 42 fitted therebetween.

The push button 36 has an inward-extending tab 44 that terminates in a ramped end 46. The push button 36' has an inward-extending tab 44' that terminates in a ramped end 46'.

The engagement assembly 40 further includes a reciprocating push pin 48 having a plate engaging body 50 and a conical engagement end 52 for operative engagement with the ramped ends 46 and 46' of the inward-extending tabs 44 and 44' respectively. A spring 54 is fitted between the upper end of the plate engaging body 50 and the underside of the ramped ends 46 and 46'. The spring 54 urges the plate engaging body 50 away from the underside of the ramped ends 46 and 46'. By so urging the plate engaging body 50 ordinarily remains engaged with the fixed adjuster plate 30 as is known in the art. Accordingly, FIG. 3A illustrates the engagement assembly 40 in its engaged position with the fixed adjuster plate 30 and thus the movable grab handle 22 is locked against movement.

A person, about to enter or leave the vehicle, may desire that the position of the movable grab handle 22 be changed with respect to the sliding mechanism 24. In such a situation the person squeezes the push buttons 36 and 36' toward one another. This movement causes the ramped ends 46 and 46' of the inward-extending tabs 44 and 44' respectively to move toward one another, simultaneously acting on the conical engagement end 52 of the push pin 48 and causing the plate engaging body 50 to be released from engagement with the fixed adjuster plate 30. This disengagement allows the movable grab handle 22 to be moved linearly by the user with respect to the underlying sliding mechanism 24 until the desired position is located.

Once the user is satisfied that the selected position of the movable grab handle 22 with respect to the sliding mechanism 24, the user releases pressure from the push buttons 36 and 36'. With the pressure removed, the push buttons 36 and 36' are urged away from one another by the resilience of the spring 42 to their at-rest position. Simultaneously the ramped ends 46 and 46' of the inward-extending tabs 44 and 44' are respectively moved away from the conical engagement end 52 of the push pin 48, thus allowing the plate engaging body of the push pin 48 to return to its at-rest position engaging the fixed adjuster plate 30, urged on by the resilience of the spring 52.

Figure 3B:
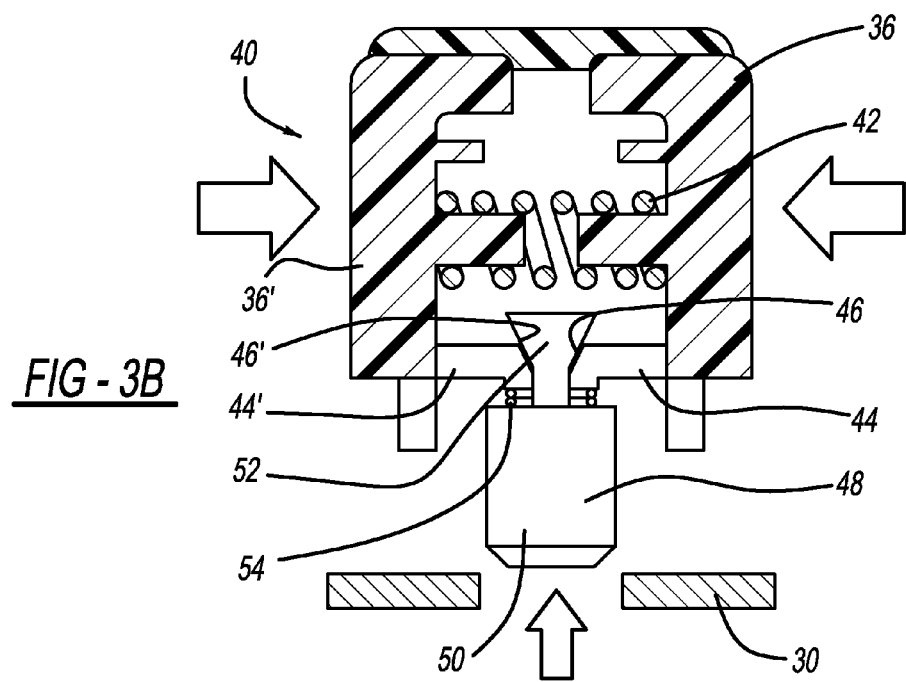
FIG. 3B is a sectional view similar to that of FIG. 3A but showing the engagement assembly of the movable grab handle in its disengaged position relative to the adjuster plate.

It is to be understood that the structure and operation of the engagement assembly 40 may be executed in ways other than those shown in FIGS. 3A and 3B. For example, other engagement and release components may be substituted for those shown in these figures. The construction illustrated in FIGS. 3A and 3B is only one possible arrangement which, if varied, would not alter the inventive aspects of the disclosed invention.

Further describing the disclosed invention, FIG. 4 is a sectional view taken along line 4-4 of FIG. 2. FIG. 4 illustrates the movable grab handle 22 in relation to the sliding mechanism 24. In particular, the movable grab handle 22 is fixed to the upper movable plate 28 by the mechanical fastener 32'. The upper movable plate 28 is slidably attached to the fixed adjuster plate 30 as is known in the art. A section view of the screw cap 33' is shown in position over the mechanical fastener 32'.

FIG. 5 is a perspective view of the movable grab handle assembly 18 illustrating, in particular, the slide mechanism cover 34 that is fitted beneath the movable grab handle 22. The slide mechanism cover 34 is provided to improve the appearance of the movable grab handle assembly 18 and preferably moves with the movable grab handle 22 upon selective movement by the user relative to the fixed adjuster plate 30.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A movable grab handle assembly attached to a pillar of a vehicle, the pillar having a top end and a bottom end, the assembly comprising:
    an adjuster plate that is fixed to the pillar;
    a grab handle slidably mounted to the adjuster plate, said grab handle including a push button, said grab handle being movable in a first direction toward the top end of the pillar and a second direction toward the bottom end of the pillar;
    a moveable pin operatively associated with said push button, whereby said pin is movable between an adjuster plate engaging position and an adjuster plate disengaging position.

2. The movable grab handle assembly of claim 1 wherein said push button comprises two push buttons.

3. The movable grab handle assembly of claim 2 wherein said two push buttons are positioned side by side.

4. The movable grab handle assembly of claim 1 further including a spring associated with said push button.

5. The movable grab handle assembly of claim 1 further including a spring associated with said movable pin.

6. A movable grab handle assembly for a vehicle interior, the assembly comprising:
    an adjuster plate fitted to the vehicle interior;
    a grab handle slidably mounted to the adjuster plate, said grab handle including a push button;
    a moveable pin operatively associated with said push button, whereby said pin is movable between an adjuster plate engaging position and an adjuster plate disengaging position.

7. The movable grab handle assembly of claim 6 wherein the interior of the vehicle includes a pillar and wherein said assembly is fitted to the pillar.

8. The movable grab handle assembly of claim 7 wherein the pillar includes a top end and a bottom end and wherein said grab handle is movable in a first direction toward the top end of the pillar and a second direction toward the bottom end of the pillar.

9. The movable grab handle assembly of claim 6 wherein said push button comprises two push buttons.

10. The movable grab handle assembly of claim 9 wherein said two push buttons are positioned side by side.

11. The movable grab handle assembly of claim 6 further including a spring associated with said push button.

12. The movable grab handle assembly of claim 6 further including a spring associated with said movable pin.

13. A movable grab handle assembly attached to an interior surface of a vehicle, the surface having a first end and a second end, the assembly comprising:
   a fixed plate formed on the interior surface of the interior;
   a grab handle slidably mounted to the fixed plate, said grab handle being movable in a first direction toward the first end of the surface and a second direction toward the second end of the surface; and
   a user-operated release mechanism for allowing selective release of said grab handle with respect to said fixed plate.

14. The movable grab handle assembly of claim 13, wherein said user-operated release mechanism includes a moveable pin, said pin being movable between an adjuster plate engaging position and an adjuster plate disengaging position.

15. The movable grab handle assembly of claim 14, wherein said user-operated release mechanism includes a push button operatively associated with said pin.

16. The movable grab handle assembly of claim 15 wherein said push button comprises two push buttons positioned side by side.

17. The movable grab handle assembly of claim 16 further including a spring associated with said push button.

\* \* \* \* \*